(12) United States Patent
Gopalan et al.

(10) Patent No.: US 10,815,125 B2
(45) Date of Patent: Oct. 27, 2020

(54) REMOVABLE NON-CONJUGATED POLYMERS FOR DISPERSING CARBON NANOTUBES

(71) Applicant: Wisconsin Alumni Research Foundation, Madison, WI (US)

(72) Inventors: Padma Gopalan, Madison, WI (US); Michael Scott Arnold, Middleton, WI (US); Catherine Kanimozhi Kansiusarulsamy, Madison, WI (US); Matthew John Shea, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 261 days.

(21) Appl. No.: 15/863,087

(22) Filed: Jan. 5, 2018

(65) Prior Publication Data
US 2019/0210876 A1    Jul. 11, 2019

(51) Int. Cl.
| | | |
|---|---|---|
| *C01B 32/168* | (2017.01) | |
| *C08F 293/00* | (2006.01) | |
| *C09D 153/00* | (2006.01) | |
| *C09D 5/00* | (2006.01) | |
| *B05D 3/10* | (2006.01) | |
| *B05D 1/00* | (2006.01) | |
| *C08F 8/00* | (2006.01) | |
| *C09D 7/65* | (2018.01) | |
| *C09D 5/20* | (2006.01) | |

(Continued)

(52) U.S. Cl.
CPC .......... *C01B 32/168* (2017.08); *B05D 1/005* (2013.01); *B05D 3/107* (2013.01); *C08F 8/00* (2013.01); *C08F 293/005* (2013.01); *C09D 5/008* (2013.01); *C09D 5/20* (2013.01); *C09D 7/65* (2018.01); *C09D 153/005* (2013.01); *B82Y 30/00* (2013.01); *B82Y 40/00* (2013.01); *C01B 2202/02* (2013.01); *C08F 2438/03* (2013.01); *Y10S 977/746* (2013.01); *Y10S 977/75* (2013.01); *Y10S 977/845* (2013.01); *Y10S 977/847* (2013.01)

(58) Field of Classification Search
CPC ..................................................... C08G 75/26
See application file for complete search history.

(56) References Cited

U.S. PATENT DOCUMENTS

| | | |
|---|---|---|
| 8,961,830 B2 | 2/2015 | Reynolds et al. |
| 9,327,979 B1 | 5/2016 | Gopalan et al. |

(Continued)

OTHER PUBLICATIONS

Lei et al., Removable and Recyclable Conjugated Polymers for Highly Selective and High-Yield Dispersion and Release of Low-Cost Carbon Nanotubes, J. Am. Chem. Soc. 2016, 138, Jan. 5, 2016, pp. 802-805.

(Continued)

*Primary Examiner* — Alexandre F Ferre
(74) *Attorney, Agent, or Firm* — Bell & Manning, LLC; Michelle Manning

(57) ABSTRACT

Polymers having pendant polycyclic aromatic hydrocarbon (PAH) groups covalently bound to the polymer backbone via thioester bonds are provided. The PAH groups are covalently bound to the backbone of the polymer by a molecular linker that includes a thioester bond. Also provided are dispersions of polymer-coated carbon nanotubes and carbon nanotube films formed from the dispersions.

28 Claims, 9 Drawing Sheets

(51) Int. Cl.
B82Y 40/00 (2011.01)
B82Y 30/00 (2011.01)

(56) References Cited

U.S. PATENT DOCUMENTS

| | | | |
|---|---|---|---|
| 9,938,149 B1 | 4/2018 | Gopalan et al. | |
| 2008/0241870 A1* | 10/2008 | Kale | C12N 5/0669 435/29 |
| 2009/0118420 A1 | 5/2009 | Zou et al. | |
| 2011/0077407 A1 | 3/2011 | David et al. | |
| 2012/0104329 A1 | 5/2012 | Meyer et al. | |
| 2013/0062577 A1 | 3/2013 | Lin et al. | |
| 2016/0272840 A1* | 9/2016 | Gopalan | C09D 133/14 |

OTHER PUBLICATIONS

Toshimitsu et al., Semiconducting single-walled carbon nanotubes sorting with a removable solubilizer based on dynamic supramolecular coordination chemistry, Nature Communications, 5:5041, DOI: 10.1038/ncomms6041, Oct. 3, 2014.

Joo et al., Isolation of Pristine Electronics Grade Semiconducting Carbon Nanotubes by Switching the Rigidity of the Wrapping Polymer Backbone on Demand, ACS Nano, vol. 9, No. 10, Sep. 8, 2015, pp. 10203-10213.

Nish et al., Highly selective dispersion of single-walled carbon nanotubes using aromatic polymers, Nature nanotechnology 2, Sep. 16, 2007, pp. 640-646.

Pochorovski et al., H-Bonded Supramolecular Polymer for the Selective Dispersion and Subsequent Release of Large-Diameter Semiconducting Single-Walled Carbon Nanotubes, J. Am. Chem. Soc. 2015, 137, Mar. 27, 2015, pp. 4328-4331.

Gerstel et al., Highly Selective Dispersion of Single-Walled Carbon Nanotubes via Polymer Wrapping: A Combinatorial Study via Modular Conjugation, ACS Macro Lett. 2014, 3, Dec. 11, 2013, pp. 10-15.

Brady et al., High performance transistors via aligned polyfluorene-sorted carbon nanotubes, Applied Physics Letters 104, 083107, Feb. 25, 2014, pp. 1-5.

Wang et al., Degradable Conjugated Polymers: Synthesis and Applications in Enrichment of Semiconducting Single?Walled Carbon Nanotubes, Advanced Functional Materials 21, 2011, pp. 1643-1651.

Bindl et al., Enhancing extraction of photogenerated excitons from semiconducting carbon nanotube films as photocurrent, Chemical Physics 413, Aug. 8, 2012, pp. 29-34.

Wang et al., Design and Synthesis of Metal Ion-Recognition-Induced Conjugated Polymers: An Approach to Metal Ion Sensory Materials, J. Am. Chem. Soc. 119, 1997, pp. 12-21.

Irving et al., The stability of transition-metal complexes, Journal of Chemical Society, Jan. 1, 1953, pp. 3192-3210.

Mistry et al., High-Yield Dispersions of Large-Diameter Semiconducting Single-Walled Carbon Nanotubes with Tunable Narrow Chirality Distributions, ACS nano 7, No. 3, Feb. 4, 2013, pp. 2231-2239.

Park et al. Highly effective separation of semiconducting carbon nanotubes verified via short-channel devices fabricated using dip-pen nanolithography, ACS Nano, vol. 6, No. 3, Feb. 21, 2012, pp. 2487-2496.

Arnold et al., Sorting carbon nanotubes by electronic structure using density differentiation, Nature Nanotechnology, vol. 1, Oct. 4, 2016, pp. 60-65.

Subbaiyan et al., Benchtop aqueous two-phase extraction of isolated individual single-walled carbon nanotubes, Nano Research, DOI: 10.1007/s12274-014-0680-z, Dec. 8, 2014.

Brady et al., Polyfluorene-Sorted, Carbon Nanotube Array Field-Effect Transistors with Increased Current Density and High On/Off Ratio, ACS Nano, vol. 8, No. 11, Nov. 10, 2014, pp. 11614-11621.

Berton et al., Influence of molecular weight on selective oligomer-assisted dispersion of single-walled carbon nanotubes and subsequent polymer exchange, Chem. Commun., 48, Jan. 12, 2012, pp. 2516-2518.

Liang et al., Selective and Reversible Noncovalent Functionalization of Single-Walled Carbon Nanotubes by a pH-Responsive Vinylogous Tetrathiafulvalene-Fluorene Copolymer, J. Am. Chem. Soc., 136, Dec. 26, 2013, pp. 970-977.

Imin et al., The effect of molecular weight on the supramolecular interaction between a conjugated polymer and single-walled carbon nanotubes, Polym. Chem., 2, Apr. 6, 2011, pp. 1404-1408.

Shea et al., Experimental Measurement of the Binding Configuration and Coverage of Chirality-Sorting Polyfluorenes on Carbon Nanotubes, J. Phys. Chem. Lett., 5, Oct. 9, 2014, pp. 3742-3749.

El-Hayek, et al., Characterization of s-SWCNT/PF-PD Dispersions and Networks (2016).

Bahun et al., Solubilizing Single-Walled Carbon Nanotubes with Pyrene-Functionalized Block Copolymers, Journal of Polymer Science: Part A: Polymer Chemistry, 2006, 44, pp. 1941-1951.

Meuer et al., Pyrene Containing Polymers for the Non-Covalent Functionalization of Carbon Nanotubes, Macromol. Chem. Phys. 2009, 210, pp. 1528-1535.

Heilmann et al., Chemistry and Technology of 2-Alkenyl Azlactones, Journal of Polymer Science Part A: Polymer Chemistry 2001, 39, pp. 3655-3677.

International Search Report and Written Opinion for PCT/US2018/065350, dated Apr. 5, 2019.

Choi et al., "Self-assembly and post-fabrication functionalization of microphase separated thin films of a reactive azlactone-containing block copolymer." Macromolecules, ol. 49, No. 21, pp. 8177-8186, 2016.

* cited by examiner

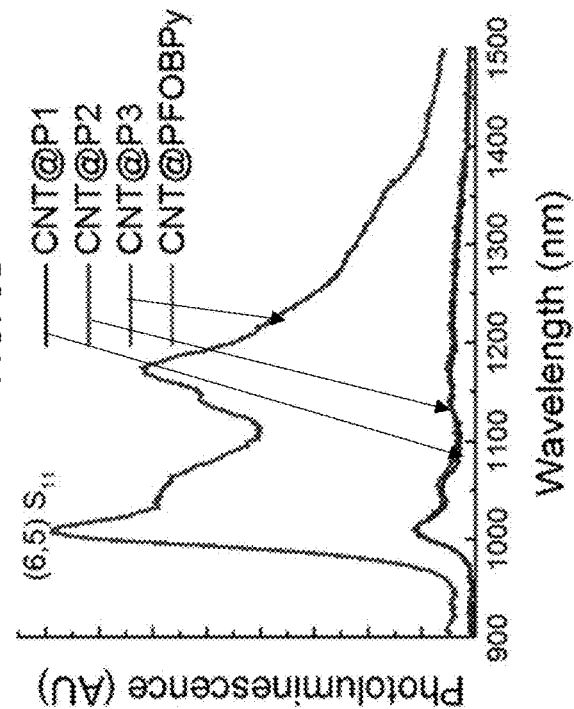
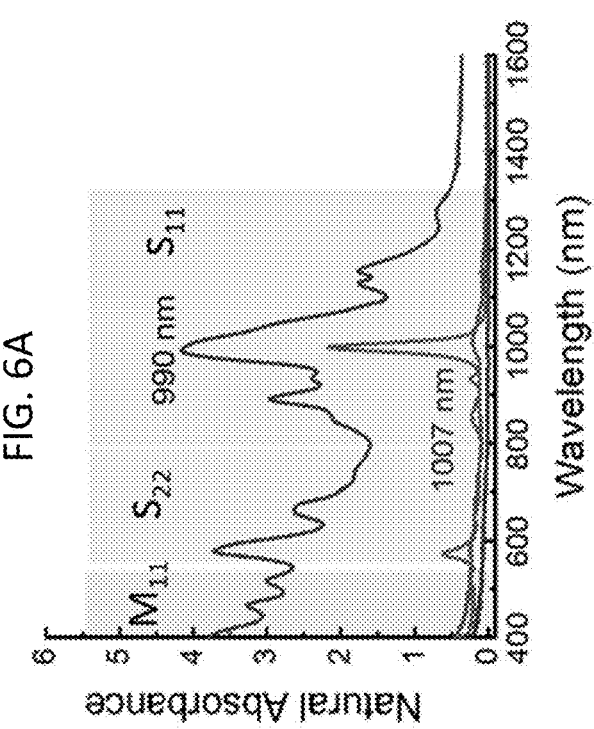
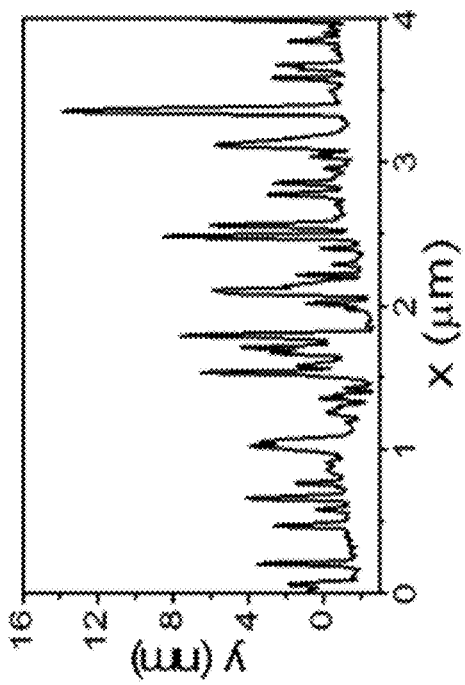
FIG. 6A
FIG. 6B
FIG. 6E

REMOVABLE NON-CONJUGATED POLYMERS FOR DISPERSING CARBON NANOTUBES

REFERENCE TO GOVERNMENT RIGHTS

This invention was made with government support under DE-SC0002148 awarded by the U.S. Department of Energy and W911NF-12-1-0025 awarded by the ARMY/ARO. The government has certain rights in the invention.

BACKGROUND

Dispersion, and hence de-bundling, of single-walled carbon nanotubes (CNT's) are essential steps in processing CNTs into devices or materials for applications ranging from composites to electronics. Though dispersion was the initial focus of this field, sorting of high-purity, electronic grade, semiconducting, single-walled carbon nanotubes (S-CNTs) from a heterogeneous mixture turned out to be critically important for micro- and onto-electronic applications such as solar cells, field effect transistors (FETs) and logic circuits. This challenge has been overcome to some extent as quantitative removal of metallic CNT (M-CNT) impurities has become possible. However, the band-gap heterogeneity in S-CNTs is still a challenge. The former has been achieved in organic solvents by using conjugated polymers that non-covalently and selectively bind to S-CNTs and disperse them, effectively eliminating their metallic counterparts.

These conjugated polymers have been predominantly optimized to selectively wrap around S-CNTs with high fidelity. However, they are not optimized for directing the assembly and the packing of CNTs into aligned arrays. It is often laborious to build in the S-CNT selectivity and other desired properties for processing and selective placement in the same polymer. This is due to the challenges inherent in the synthesis of conjugated polymers, namely incorporating multiple monomers with variable reactivities, catalyst poisoning, and the problems with purification of the end product. In addition, in the final FET device, polymer residues increase the contact resistance, resulting in inferior performance.

SUMMARY

Polymers having pendant polycyclic aromatic hydrocarbon groups covalently bound to a polymer backbone via thioester bonds are provided and carbon nanotubes coated with the polymers. Also provided are methods for dispersing carbon nanotubes in organic solvents using the polymers and carbon nanotube films formed from the dispersions.

One embodiment of a block copolymer includes: (a) a first polymer block; and (b) a second polymer block, the second polymer block having a polymer backbone chain and pendant polycyclic aromatic hydrocarbon groups. The pendant polycyclic aromatic hydrocarbon groups are covalently linked to the polymer backbone chain by molecular linkers that include a thioester bond.

One embodiment of a polymer-coated carbon nanotubes includes: (a) carbon nanotubes; and (b) a block copolymer coating the carbon nanotubes. The block copolymer includes: (a) a first polymer block; and (b) a second polymer block, the second polymer block having a polymer backbone chain and pendant polycyclic aromatic hydrocarbon groups. The pendant polycyclic aromatic hydrocarbon groups are covalently linked to the polymer backbone chain by molecular linkers that comprise a thioester bond.

One embodiment of a method of forming a carbon nanotube film includes forming a film of polymer-coated carbon nanotubes on a substrate, the polymer-coated carbon nanotubes including: carbon nanotubes; and a block copolymer coating the carbon nanotubes. The block copolymer includes: (a) a first polymer block; and (b) a second polymer block, the second polymer block having a polymer backbone chain and pendant polycyclic aromatic hydrocarbon groups. The pendant polycyclic aromatic hydrocarbon groups are covalently linked to the polymer backbone chain by molecular linkers that comprise a thioester bond. The method further includes exchanging the pendant polycyclic aromatic hydrocarbon groups with thiol molecules that do not bond to the carbon nanotubes, whereby the polymer coating is released from the carbon nanotubes; and removing the polymer coating from the carbon nanotubes.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 6A shows the absorbance spectra of CNT @ P1, CNT @ P2, CNT @ P3 and CNT@PFO-BPy in toluene. FIG. 6B shows the photoluminescence (PL) emission spectra of CNT @ P1, CNT @ P2 and CNT @ P3 in toluene excited $S_{11}$ transition of (6,5) CNTs at 580 nm. FIG. 6E shows the height profile of CNT @ P3 after removal of P3.

DETAILED DESCRIPTION

Polymers having pendant polycyclic aromatic hydrocarbon (PAH) groups covalently bound to the polymer backbone via thioester bonds are provided. Various embodiments of the polymers can be used to coat the surfaces of carbon nanotubes to debundle the nanotubes and/or to enhance their dispersibility in organic solvents. Dispersions of the polymer carbon nanotubes can be used to form carbon nanotube films.

The polymers include homopolymers polymerized from a single type of monomer, block copolymers polymerized from two or more types of monomers, and random copolymers polymerized from two or more types of monomers. The pendant PAH groups are comprised of multiple aromatic rings, which may include C$_6$ and/or C$_5$ aromatic rings. For polymers designed to coat carbon nanotubes, the pendant PAH groups desirably include multiple C$_6$ rings, which are able to bond the polymers to a carbon nanotube surface via π-π bonding interactions. Pyrene is one example of a PAH that can be used as a pendant group. Other examples include naphthalene, anthracene, phenanthrene, tetracene, and pentacene.

The PAH groups are covalently linked to the backbone of the polymer by a molecular linker that includes the thioester bond. The length of the molecular linker can be tailored to reduce or optimize the degree of steric interaction between the PAH groups in order to avoid the aggregation of those groups in applications where such aggregation is undesirable. Thus, in some embodiments of the polymers, the molecular linker has a linker chain length of two to twelve atoms. This includes embodiments of the molecular linkers having a linker chain length of 4 to 10 atoms. For the purposes of this disclosure, the linker chain length of a molecular linker includes all of the atoms in a chain of atoms connecting the PAH group to the backbone chain of the polymer, but does not include atoms that are pendant from the linker chain. By way of illustration, in FIG. 4, scheme (a), middle panel, the molecular linkers connecting the pyrene groups to the backbone chain of the block copolymer have a linker chain length of nine atoms. In addition to the atoms that form part of the thioester bond, the linker chain can include, for example, a hydrocarbon chain.

Figure 2:
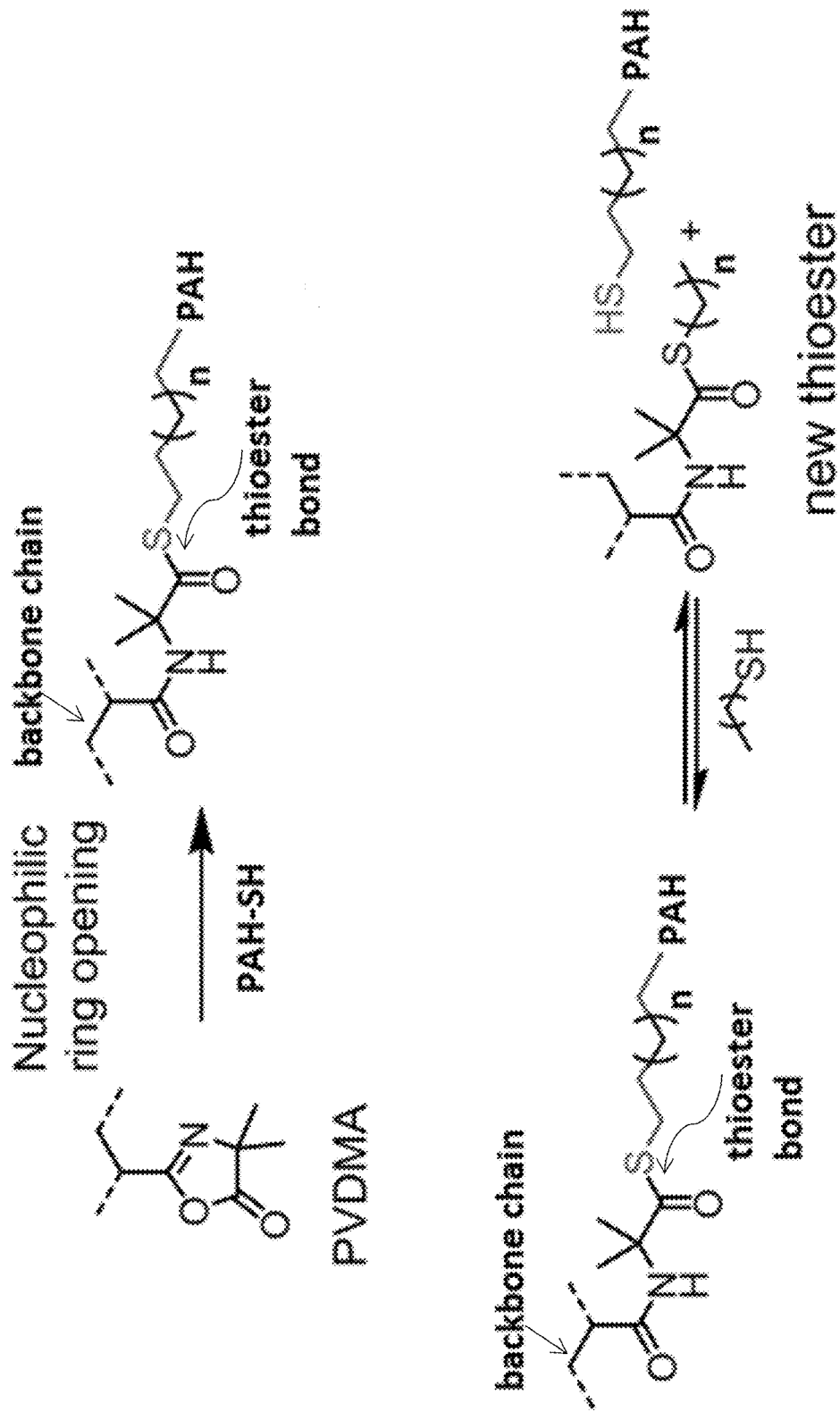
FIG. 2 shows a scheme for the post-polymerization functionalization of a PVDMA polymer with PAH groups (top panel) and a scheme for the A scheme a thiol exchange reaction between an alkyl thiol molecule and a pendant PAH group.

The pendant PAH groups can be added to a polymer via a post-polymerization functionalization of the polymer. In some embodiments, this functionalization is carried out via the ring opening of an azlactone in an azlactone group-containing polymer using nucleophiles to quantitatively introduce PAH side groups. This chemistry overcomes many of the challenges with previous methods, such as limited PAH incorporation, and provides the flexibility to alter the polymer architecture, solubility and degradability. Starting with a polymer that includes pendant azlactone rings, PAH groups can be added via a nucleophilic azlactone ring-opening reaction in the presence of a thiol-functionalized PAH. In the resulting polymer, the PAH groups are bound to the polymer backbone by a molecular linker that includes both an amide bond and a thioester bond. Poly(2-vinyl-4,4-dimethyl azlactone) (PVDMA), block copolymers comprising PVDMA blocks, and random copolymers polymerized from 2-vinyl-4,4-dimethyl azlactone monomers are examples of azlactone ring-containing monomers. The scheme for this post-polymerization functionalization is illustrated in FIG. 2, top panel.

The polymers can further include one or more additional types of pendant groups. For example, in some embodiments of the polymers, additional pendant groups are included in order to enhance the solubility of the polymer in an organic solvent. Such groups are referred to as solubilizing groups. For polymers designed to enhance the dispersibility of carbon nanotubes, the length and/or bulk of the additional pendant groups can be used to control the spacing between the carbon nanotubes in dispersions of the carbon nanotubes and in films formed from the dispersions, whereby longer and/or bulkier groups would generally provide larger spacing. In order to enhance the dispersibility of the carbon nanotubes in an organic solvent, the additional pendant groups may include a hydrophobic molecular chain, such as a polystyrene chain, an alkyl chain, a poly methyl methacrylate chain, or a chain that includes a combination of a polystyrene chain, an alkyl chain, and/or a poly methyl methacrylate chain. The optimum length of the molecular chain will depend, at least in part, on the desired degree of solubility of the polymer and the nature of the solvent in which the polymer will be dissolved. By way of illustration only, in some embodiments of the polymers, the molecular chain is a polystyrene chain having a number average molecular weight (Mn) in the range from 1000 to 5000. In other embodiments of the polymers, the molecular chain is an alkyl chain of six to twenty carbon atoms, such as an n-hexyl chain, an n-octyl chain, or an n-dodecyl chain. In other embodiments of the polymers, the molecular chain is polymethylmethacrylate having an $M_n$ in the range from 2000 to 8000.

Like the pendant PAH groups, the additional pendant groups can be added to a polymer via a post-polymerization functionalization of the polymer. For example, starting with a polymer that includes pendant azlactone rings, additional pendant groups can be added via a nucleophilic azlactone ring-opening reaction in the presence of a thiol-functionalized molecule, such as a thiol-functionalized polystyrene, alkylene, or poly methyl methacrylate. In the resulting polymer, the additional pendant groups are bound to the polymer backbone by a molecular linker that includes both an amide bond and a thioester bond. However, other known chemistries can be used to post-functionalize a starting polymer with the additional pendant groups. For example, pendant groups containing other nucleophiles, such as primary alcohols, can be used to post-functionalize the polymer.

Figure 1:
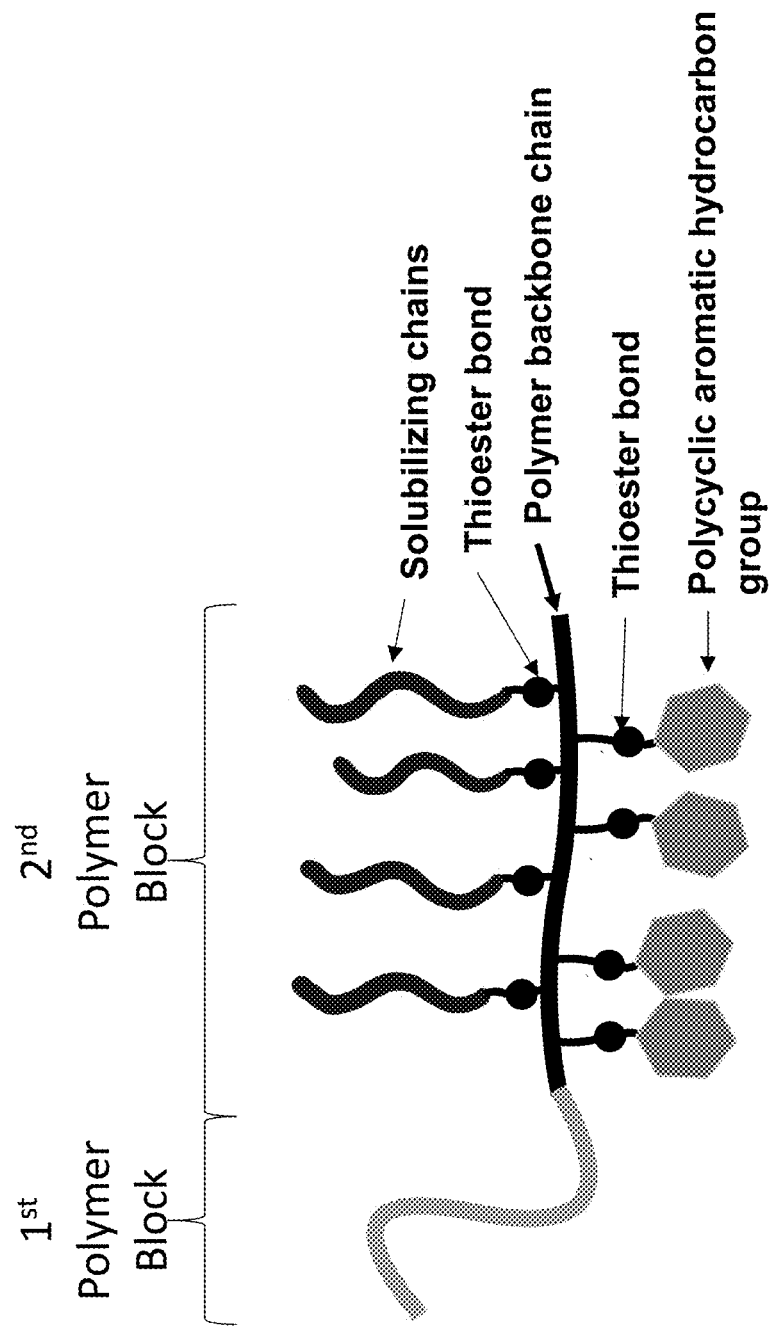
FIG. 1 is a schematic illustration of a portion of a diblock copolymer that includes a first block and a second block, wherein the second block includes pendant PAH groups and pendant solubilizing groups.

The polymers can be block copolymers composed of two or more different polymer blocks. The block copolymers include a first polymer block that can be selected to tailor the chemical and/or physical properties of the polymer for a particular application and a second polymer block that includes the pendant PAH groups and, optionally, one or more additional pendant groups, such as solubilizing groups. The first and second blocks alternate along the length of the block copolymer. Thus, a block copolymer will comprise a plurality of the first blocks and a plurality of the second blocks. A schematic illustration of a portion of a diblock copolymer that includes a first block and a second block, wherein the second block includes pendant PAH groups and pendant solubilizing groups, both of which are covalently bonded to the polymer backbone chain by thioester bonds, is shown in FIG. 1. The first polymer block may also include pendant groups on its polymer backbone. These pendant groups may be selected to enhance the solubility of the block copolymer in an organic solvent and, therefore, may be hydrophobic groups. Examples of polymers from which the first polymer block may be formed include polystyrene and poly methyl methacrylate. The polystyrene may be an unsubstituted polystyrene or a substituted polystyrene, such as a poly t-butyl styrene or a poly 4-tetrahydropyran styrene (P4THP-styrene).

The polymers, including starting polymers that are subsequently post-functionalized with pendant groups, can be polymerized from polymerizable monomers using known processes, including radical polymerization processes, such as RAFT polymerization, Atom Transfer Radical Polymerization (ATRP) and activated ATRP, and Nitroxide-Mediated Radical Polymerization (NMP). Polymerizable monomers include vinyl monomers, styrene monomers, and (meth) acrylate monomers. The polymer backbone chain may comprise or be composed entirely of carbon atoms; although the carbon atom chains of the backbone may have terminal groups that comprise atoms other than carbons.

Various embodiments of the block copolymers can be used to form dispersions of carbon nanotubes in organic solvents. The block copolymers are generally highly soluble in an organic solvent and have the ability to bond to the carbon nanotubes via $\pi$-$\pi$ interactions between their pendant PAH groups and the carbon nanotube surfaces. Organic solvents in which various embodiments of the block copolymers may be soluble include aromatic solvents, such as toluene, xylene, and tetrahydrofuran, and further including halogenated solvents, such as chloroform and dichloromethane. For applications in which the doping of the carbon nanotube surfaces by a solvent would be detrimental, toluene and xylene may be preferred. By incorporating a sufficiently high concentration of pendant PAH groups and high molecular weight solubilizing groups into the block copolymers, the block copolymers can be designed to disperse even long single-walled carbon nanotubes. However, the block copolymers can be used to disperse carbon nanotubes having different chiralities and a wide range of dimensions, including multi-walled carbon nanotubes (MWCNTs), single-walled carbon nanotubes (SWCNTs), and mixtures thereof. The carbon nanotubes can be semiconducting carbon nanotubes, metallic carbon nanotubes, or a mixture thereof although for some electronics applications it is desirable to use a pre-sorted single-walled carbon nanotube sample that is composed predominantly of (e.g., ≥80% or ≥90%), or entirely of, semiconducting single-walled carbon nanotubes. By way of illustration, carbon nanotubes, including single-walled carbon nanotubes, having lengths in the range from 100 nm to 1000 nm and/or diameters in the range from 0.7 nm to 1.7 nm can be used. However, carbon nanotubes having dimensions outside of these ranges can also be used.

Block copolymers that are particularly well-suited for dispersing long single-walled carbon nanotubes in organic solvents include block copolymers in which the first polymer block is a polystyrene block and the second polymer block comprises pendant pyrene groups and pendant polystyrene side chains. The synthesis of such block copolymers is illustrated in the Example. Within this family of block copolymers, some embodiments meet one or more of the following criteria: (a) the polystyrene block has a molecular weight of at least 20 kg/mole; (b) the second block has a molecular weight in the range from 40 to 70 kg/mole; (c) there are at least 40 pyrene pendant groups per block of the second polymer block; and/or (d) the polystyrene side chains have a molecular weight of at least 1 kg/mole. Some embodiments of the block copolymers meet at least three of these criteria and some embodiments of the block copolymers meet all of these criteria.

Carbon nanotube dispersions can be formed by combining the carbon nanotubes with the polymers in an organic solvent and mixing (e.g., sonicating) the mixture, whereby the polymer forms a coating on the carbon nanotubes and the polymer-coated carbon nanotubes are dispersed in the solvent. The concentration of carbon nanotubes and polymer in the dispersion and the size of the pendant groups on the polymer will determine the degree of carbon nanotube dispersion. In some embodiments of the dispersions, the carbon nanotubes are debundled and dispersed as individual, isolated carbon nanotubes.

The concentration of the polymers in the dispersion will depend, at least in part, on the solubility of the polymer is a chosen solvent and/or on the desired minimum yield for the polymer-coated carbon nanotubes. For example, some embodiments of the dispersions have a polymer concentration in the range from about 0.1 mg/mL to about 100 mg/mL, including dispersions having a polymer concentration in the range from about 0.1 mg/mL to about 50 mg/mL. However, concentrations outside of these ranges may be used. Similarly, the concentration of the carbon nanotubes in the dispersion will depend, at least in part, on the dispersibility of the carbon nanotubes in the solution and/or on the desired minimum yield for the polymer-coated carbon nanotubes. Generally, the carbon nanotube concentration will be sufficiently low to avoid gelation of the nanotubes. For example, some embodiments of the dispersions have a carbon nanotube concentration in the range from about 0.1 mg/mL to about 2 mg/mL. However, concentrations outside of this range may be used.

Once dispersed, the polymer-coated carbon nanotubes can remain stable against agglomeration and settling out of solution for substantial periods of time. For example, a dispersion can be stable for periods of at least 10 hours, at least 24 hours, at least 72 hours, or longer, at room temperature (e.g., ~23° C.).

A carbon nanotube dispersion can be used to form a solid carbon nanotube film on a substrate surface by applying the dispersion onto the surface and removing the solvent. The dispersion can be applied by, for example, drop casting, spin coating, dip coating, spraying, or printing. The solvent can be removed simply by allowing it to evaporate. The evaporation can be accelerated by heating the applied dispersion and/or by applying a vacuum to the applied dispersion.

Figure 3:
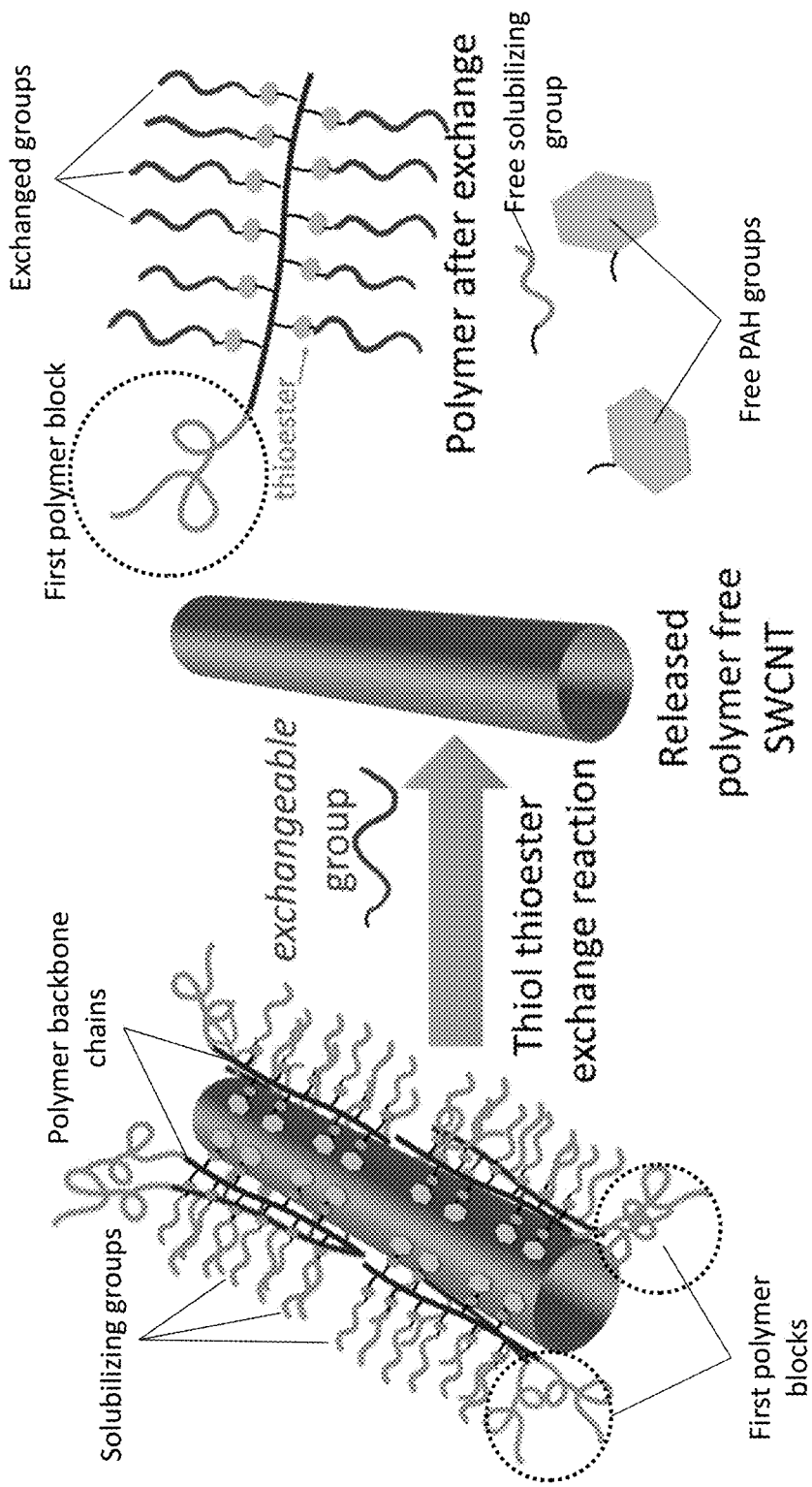
FIG. 3 shows a schematic representation of the removal of a polymer coating from a single-walled carbon nanotube via thiol-thioester exchange.

The polymers can be removed from the carbon nanotubes, or from other substrates or structures to which they are bound, via a thiol-thioester exchange reaction. This is advantageous for applications where the polymer coating is undesirable, including many electronic and optoelectronic applications. The release of the polymer can be carried out in an acid-free organic solvent medium. The removal of the polymer is possible because the thioester bonds linking the pendant groups to the backbone of the polymer can undergo a reversible exchange with other thiol molecules in the presence of an organic base. Suitable thiols include alkyl thiols, which are converted into thiolate anions by the base. Thus, by exposing the polymer-coated carbon nanotubes to a solution containing the thiol molecules and the organic base, the PAH pendant groups of the polymer can be replaced with pendant groups that do not bond to the carbon nanotubes. As a result, the formerly pendant PAH groups are released from the polymer backbone and polymer is released from the carbon nanotubes. The released PAH molecules and polymer can then be removed by washing. A scheme for a thiol exchange reaction between an alkyl thiol molecule and a pendant PAH group is shown in FIG. 2, bottom panel. A schematic representation of the removal of a polymer coating from a single-walled carbon nanotube is shown in FIG. 3, where the left side of the figures represents a polymer-coated carbon nanotube and the right side of the figure shows the uncoated carbon nanotube and the released post-thiol exchanged polymer and free PAH groups.

Example

This example demonstrates the synthesis of a block copolymer composed of polystyrene (PS) as the first block and PVDMA as the second block synthesized by RAFT polymerization. Three block copolymer architectures were explored, starting from the polystyrene-block-polyvinyl-4, 4-dimethylazlactone (PS-b-PVDMA) base polymer. Their effectiveness was tested in not only solubilizing CNTs, but in minimizing CNT bundling, and with keeping CNTs stable in solution. These architectures differ in how the second block is functionalized, namely where the PVDMA block is functionalized with: (a) a 100% pyrene groups (P1), (b) a mixture of pyrene and alkyl side groups (P2), and (c) a mixture of pyrene and polystyrene side chains (P3). UV-vis-NIR absorption and PL emission studies indicate that a block-brush architecture with pyrene/PS mixed side chains grafted to the second block (P3) gave the most stable CNT dispersions with highest yields. The molecular weight of the first PS block, as well as the number of pyrene side groups in the second block, were found to affect the stabilization of CNTs in organic solvents. It is further shown that this design allows for thiol-thioester exchange chemistry to release the polymer wrappers from the CNT surface in an acid free organic solvent medium.

Design and Synthesis of Block Copolymers

The first block is a PS block, which imparts solubility in common organic solvents. The second block has a high density of grafted pyrene containing side chains, which is similar to a bottle brush architecture. The pyrene groups preferentially interact with the CNT surface, hence solubilizing them in organic solvents. To achieve the high grafting density required for the bottle-brush design a highly reactive PVDMA backbone was chosen. The five-membered heterocyclic VDMA ring was an excellent candidate for the second block, as it had a polymerizable vinyl group (Scheme (a), Step 1 in FIG. 4), could be readily polymerized by the RAFT method, and had a carbonyl (C=O) group that could be ring opened quantitatively (Scheme (a), Step 2 in FIG. 4) by nucleophiles, such as amine and thiol (—NH$_2$ and —SH), post-polymerization. The resulting functional groups, such as amide (RC(O)NHR') or thioester (RSC(O)R'), were chemically reversible (Scheme (a), Step 3 in FIG. 4), though amide degradation requires much harsher conditions.

Figure 4:
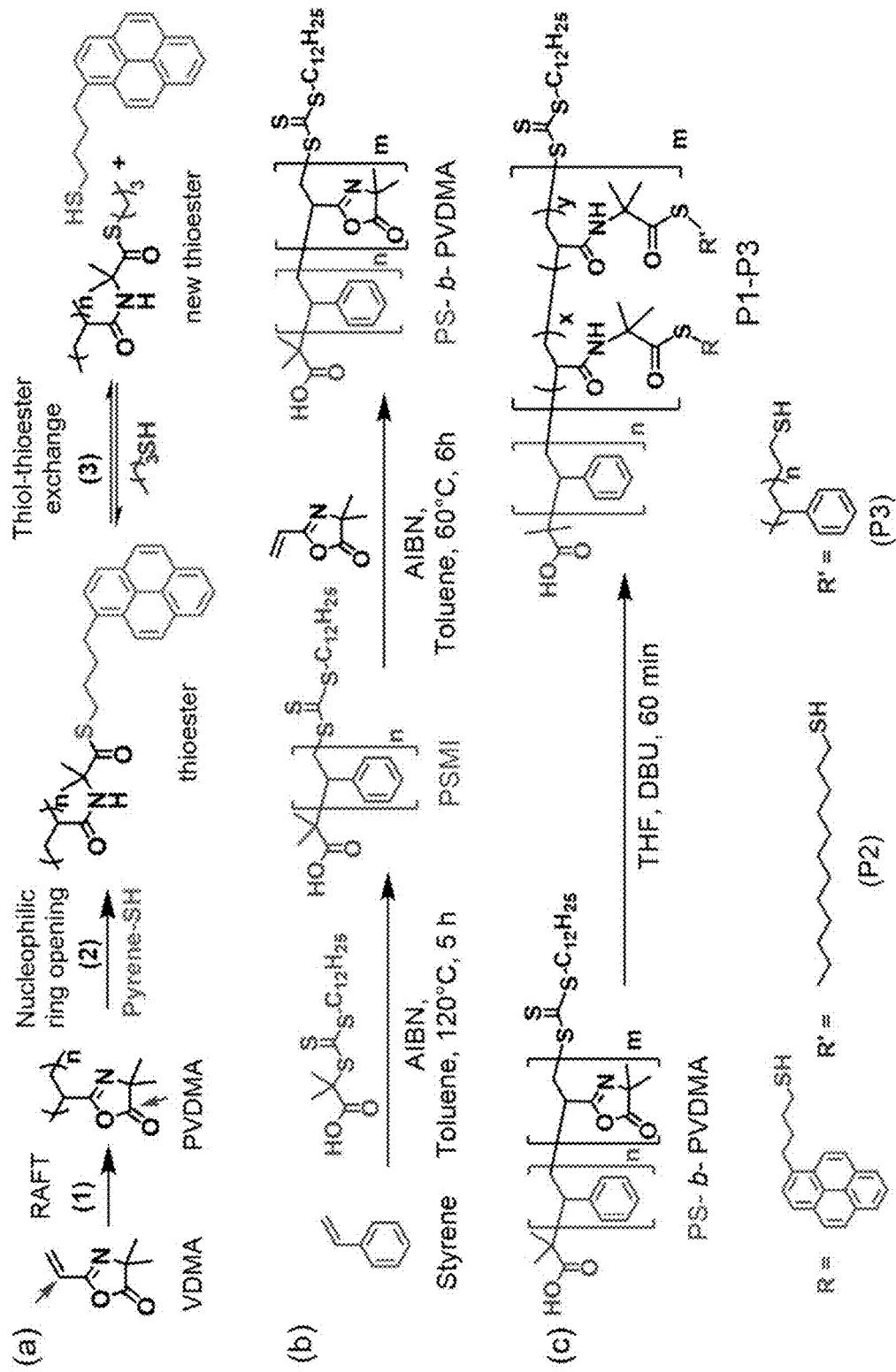
FIG. 4. Scheme (a) depicts the chemistry of VDMA with multi-functional groups for polymerization by (1) Reversible Addition Fragmentation Chain Transfer (RAFT) (2) Nucleophilic ring opening of VDMA; and (3) the reversible nature of the thioester group by thiol-thioester exchange reaction. Scheme (b) depicts the synthesis of PSMI by RAFT followed by chain extension to PS-b-PVDMA by VDMA. Scheme (c) depicts post-functionalization of PS-b-PVDMA via nucleophilic ring opening of the VDMA ring.

PS macro initiator (PSMI) was synthesized by RAFT and chain extended by VDMA to synthesize PS-b-PVDMA (Scheme (b) in FIG. 4). 1-Pyrenebutanethiol was synthesized following the procedure described in ACS Nano, 2008, 2 (1), pp 77-84 and used as a nucleophile to post-functionalize the PVDMA block. More nucleophilic 1-pyrenebutyl thiolate anion (PyS$^-$) was generated in the presence of an organic base, namely 1, 8-diazabicyclo [5.4.0] undec-7-ene (DBU) (Scheme (c) in FIG. 4). Owing to the high nucleophilicity of PyS$^-$, ring opening of the azlactone ring proceeded quantitatively. The extent of pyrene incorporation (>95%) was quantified by $^1$H NMR spectroscopy by integrating the peaks for the aromatic protons from pyrene units (7.54-8.35 ppm).

To study the effects of the length of the first PS block and the number of pyrene tethers in the second PVDMA block, four BCPs with the P1 architecture were made (Table 1). The molecular weight of the first PS block was fixed at 20 K or 40K, and that of the PVDMA block was varied from 2.8, 5.6 to 9.1 K. Quantitatively functionalizing the PVDMA block of these four BCPs resulted in 20, 40 and 64 units of pyrene, respectively. Subsequent tests using these four polymers to disperse CNTs in toluene showed that while a 20K length of PS first block was sufficient, the second block benefitted from at least 60 pyrene units [P1(D)].

TABLE 1

Optimization of block copolymers P1 (A) to P1 (D).

| Polymer Name | [a] PS-b-PVDMA kg mol$^{-1}$ | [a] PDI | [b] PS Đ | [b] PVDMA Đ | [b] Number of Pyrene units | Stability of CNT dispersion in toluene |
|---|---|---|---|---|---|---|
| P1(A) | 20k-2.8k | 1.15 | 192 | 20 | 20 | no |
| P1(B) | 20k-5.6k | 1.13 | 192 | 40 | 40 | unstable |
| P1(C) | 40k-5.9k | 1.15 | 384 | 42 | 40 | unstable |
| P1(D) | 20k-9.1k | 1.15 | 192 | 66 | 64 | Stable |

[a] Obtained from GPC using polystyrene standards,
[b] determined from $^1$HNMR spectroscopy,
P1(D) = P1

Figure 5A:
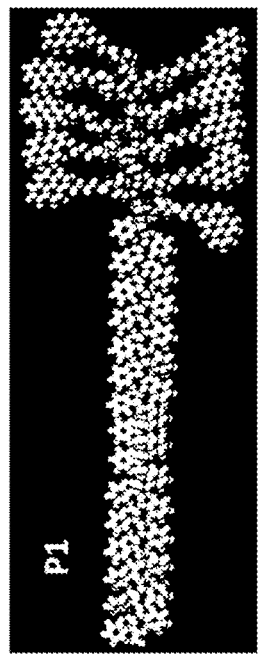
FIG. 5A depicts the chemical structure (left) and schematic representation (right) of pyrene containing block copolymer P1.
Figure 5A:
Figure 5B:
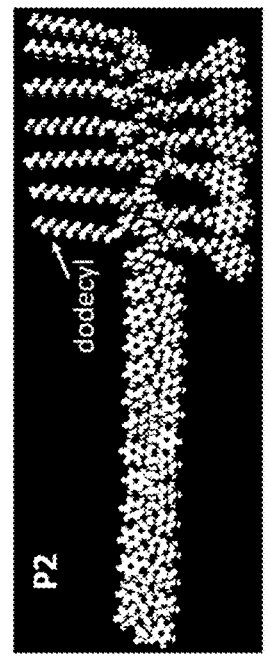
FIG. 5B depicts the chemical structure (left) and schematic representation (right) of pyrene containing block copolymer P2.
Figure 5B:
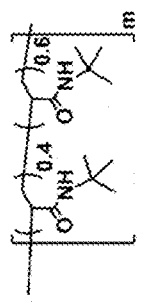
Figure 5C:
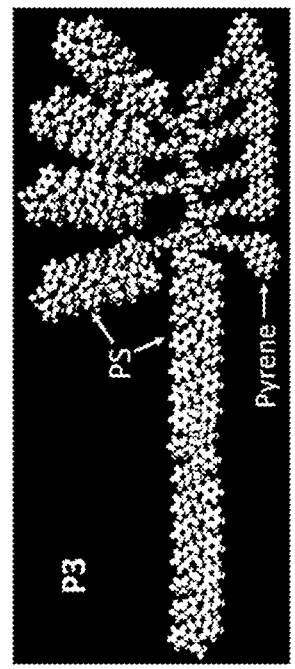
FIG. 5C depicts the chemical structure (left) and schematic representation (right) of pyrene containing block copolymer P3.
Figure 5C:
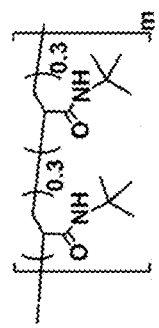

Based on these results, the PS block length was fixed to 20K and the PVDMA block functionalization was changed to incorporate at least 60 pyrene units. The effect of the type of side groups in the PVDMA block on CNT dispersion and bundling was also studied. A simple long chain (—C$_{12}$H$_{15}$) alkyl side group and a polymeric side group, namely PS, were explored. To incorporate these side groups, along with 60 pyrene units in the second block, a PS-b-PVDMA was synthesized with a molecular weight of 20K (192)-26.4K (208) Table 2. This BCP was reacted with a mixture of 1-pyrenebutanethiol and n-dodecyl thiol, and 1-pyrenebutanethiol and thiol terminated polystyrene (M$_n$=5 kg/mol), in the presence of excess DBU under inert conditions. Following reaction and purification, the final copolymer compositions, determined by $^1$H NMR, were P2 with 69 pyrene units+134 C12 units and P3 with 64 pyrene units+60 PS units. For comparison, PVDMA (15k) was also made by RAFT polymerization and functionalized it with 100% pyrene side chains as well as with a 30:70 ratio of pyrene: C12 side chain (Table 3). In both cases the solubility of the polymer toluene was lower than the solubility in THF. Further studies on the dispersion of CNTs was done using the block copolymers P1 (i.e., P1D), P2 and P3, the structures of which are shown in the top, center, and lower panels of FIGS. 5A, 5B and 5C, respectively.

TABLE 2

Characterization of copolymers P1-P3.

| Polymer Name | $^a$PS-b-PVDMA kg mol$^{-1}$ | $^a$PDI | $^b$PS Đ (n) | $^b$PVDMA Đ (m) | $^b$Pyrene units (x) | $^b$dodecyl units (y) | $^b$PS ($M_n$ = 5k) (y) | Stability of CNT dispersion in toluene |
|---|---|---|---|---|---|---|---|---|
| P1 | 20k-9.1k | 1.15 | 192 | 66 | 64 | — | — | stable |
| P2 | 20k-26.4k | 1.19 | 192 | 208 | 69 | 134 | — | unstable |
| P3 | 20k-26.4k | 1.19 | 192 | 208 | 64 | — | 60 | stable |

$^a$Obtained from GPC using polystyrene standards,
$^b$determined from $^1$HNMR spectroscopy.

TABLE 3

Characterization of functionalized PVDMA.

| Polymer Name | $^a$Mn overall kg mol$^{-1}$ | $^a$PDI | $^b$PVDMA Đ | $^b$Number of pyrene units | $^b$Number of —$C_{12}H_{24}$ | solubility in toluene | $^c$MWCNTs |
|---|---|---|---|---|---|---|---|
| PVDMA-Py1 | 15 | 1.2 | 108 | 25 | — | insoluble | dispersion |
| PVDMA-Py2$^b$ | 15 | 1.2 | 108 | 30 | 70 | insoluble | dispersion |

$^a$$M_n$ Obtained from GPC using polystyrene standards,
$^b$determined from $^1$HNMR spectroscopy,
$^c$As the polymers are sparingly soluble in toluene M-CNTs were dispersed in THF.

Dispersion Studies

Full length raw SG65i-CoMoCAT CNTs with diameters of 0.7-0.9 nm were dispersed using P1, P2 and P3 in toluene. All the polymers were highly soluble, with solubilities of >50 mg/mL in toluene. For the dispersion of these CNTs, 0.2 mg of S-CNTs and 2 mg of P1 to P3 were combined in a total of 2 mL of toluene. All the mixtures were tip sonicated for 10 min and the resulting dark solutions were ultra-centrifuged for 10 min to remove the undissolved particles and possible larger CNT bundles. All of the three polymers dispersed CNTs in toluene. These dispersions are denoted as CNT @P1, CNT @P2 and CNT @P3. For comparison CoMoCAT CNTs were dispersed with the commonly used π-conjugated commercial copolymer of 9,9-dioctylfluorenyl-2,7-diyl and bipyridine (PFO-BPy), using an identical procedure (FIG. 2A). There were clear differences in the stabilities of these solutions. CNT @P1 and CNT @P3 were stable for over 6 months at room temperature.

To quantify the dispersion yields, a UV-vis-NIR absorption spectrum was taken for each of the solutions (FIG. 6A). The spectrum for each of the three dispersions consisted of two sets of peaks, from 400-550 nm corresponding to M-CNTs ($M_{11}$), and a second set of peaks at higher wavelengths (580-800 nm, 800-1300 nm) corresponding to $S_{22}$ and $S_{11}$ peaks from S-CNTs. The optical density (OD) of CNT @P3 dispersion at 992 nm was 4.20. The OD value for P3 was significantly higher than P2 (OD=0.2346 at 1001 nm) and P1 (OD=0.015 at 1001 nm). Among the three, CNT @P3 showed a 10-fold higher absorption intensity when compared to CNT@P1, CNT@P2. The sorting yield calculated from the $S_{22}$ peaks (6,5) CNTs, also followed the same trend. The measured yield for CNT @P3 was higher than that for the standard CNT @PFO-BPy.

Figure 6C:
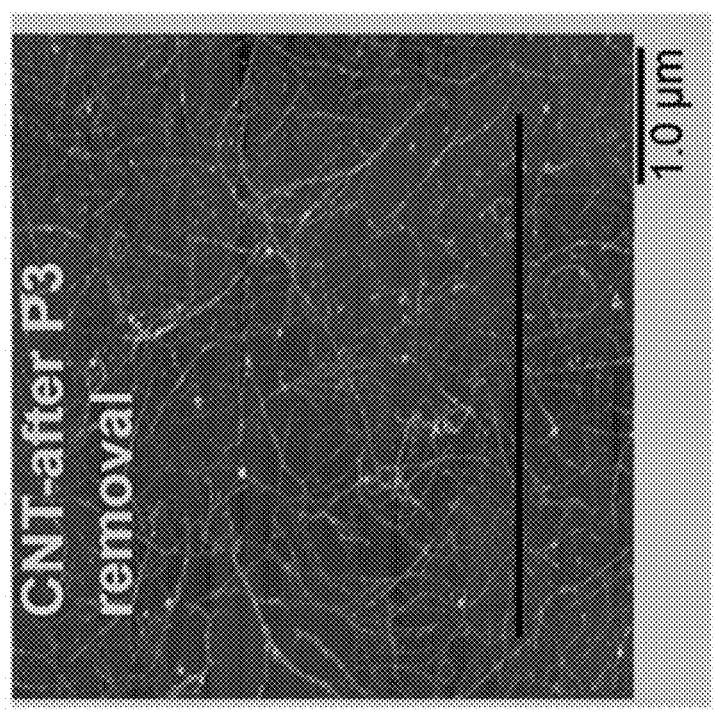
FIG. 6C shows a Photoluminescence Excitation/Emission (PLE) map of CNT @ P3 in toluene.
Figure 6D:
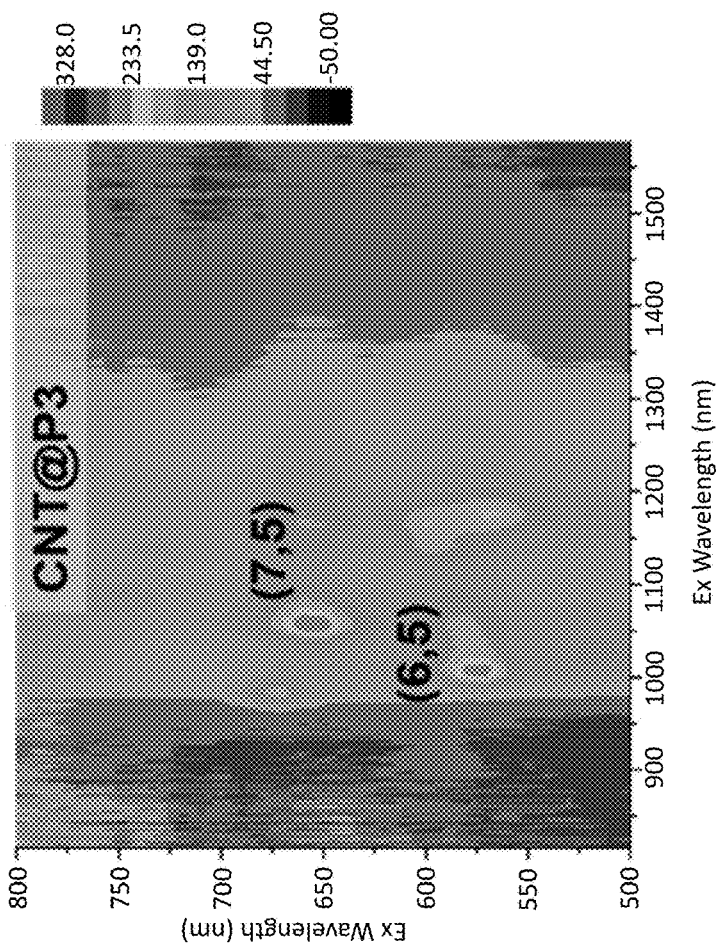
FIG. 6D shows an Atomic Force Microscope (AFM) image of CNT @ P3 after removal of P3.

Without intending to be bound to any particular theory of the invention, the inventors propose that the introduction of mixed side chains in the second block can disrupt the π-π interactions between the pyrene units, promote solubility in toluene and introduce a steric barrier to forming bundles. PS side chains in P3 may form the steric barrier to prevent interactions between multiple tubes by a single chain, resulting in stable CNT @P3 dispersion and high yields. Whereas in CNT @P2 and CNT @P3, larger bundles that make the solution less stable result in lower yields. These results are confirmed from PLE maps of the dispersions (FIG. 6B). The PLE intensity typically maps with the yields, presence or absence of metallic tubes and bundles of S-CNTs. CNT @P3 shows highest PLE intensity from (6,5) CNT and (7,5) CNT (FIG. 6C) and a broad distribution of intensities from other S-CNTs. The intensities of P2 and P1 were lower. AFM imaging (FIGS. 6D and 6E) of tubes from the CNT @P3 solution shows mostly isolated CNTs and some small bundles. Though these studies were done with CoMoCAT tubes, P3 works equally well to disperse tubes of much larger and much smaller diameters. For example, Arc-discharge CNTs with a diameter of 1.2-1.7 nm and HiPCO CNTs with a diameter of 0.9-1.2 nm were also dispersed using P3.

Polymer Removal by Exchange Reaction

Figure 7A:
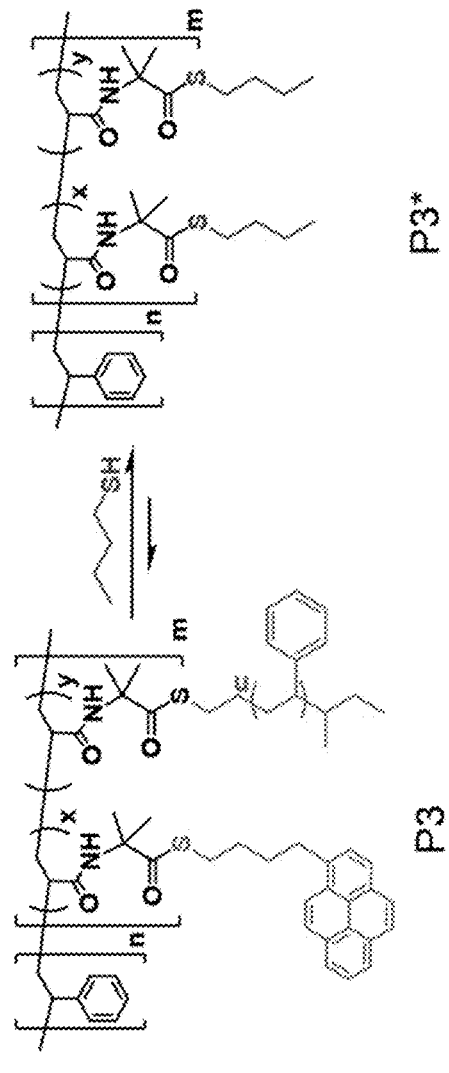
FIG. 7A shows a thiol-thioester exchange reaction between P3 and P3* in the presence of n-butane thiol.

The attachment chemistry used for incorporating pyrene side groups utilizes an exchangeable thio-ester bond that can undergo a reversible thio-esterification process. To confirm the effectiveness of this exchange reaction, P3 alone was dissolved in toluene and reacted with a large excess of n-butane thiol (n-$C_4H_9SH$) in the presence of DBU. DBU generates the more nucleophilic thiolate anion (n-$C_4H_9S^-$). Presence of large excess of n-$C_4H_9S^-$ shifts the equilibrium to the right as shown in FIG. 7A. This reaction effectively replaces the pyrene and styrene side group with butane side chains via the trans-thioesterification process resulting in a new block copolymer P3*.

Figure 7B:
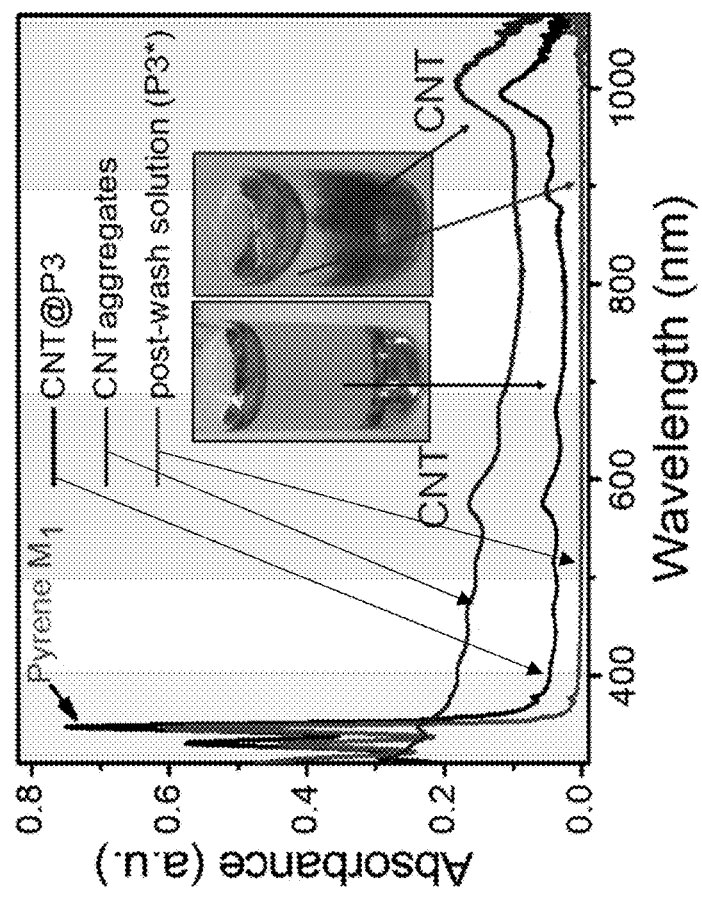
FIG. 7B shows absorbance spectra of CNT@P3 before and CNT aggregates collected after thiol exchange reaction and post wash solution after thiol exchange reaction in toluene.

This exchange reaction was implemented on the CNT @ P3 dispersion in toluene, resulting in complete release of the CNTs from the P3 polymer. Evidence for this exchange was gathered by monitoring the characteristic peaks from the pyrene groups in the P3 polymer and the CNT peaks in the UV-Vis absorption studies. The starting CNT @ P3 (FIG. 7B) solution showed the signature for pyrene peaks from P3 at 300 nm, and for $S_{22}$ (~580 nm) and $S_{11}$ (~1000 nm) peaks from (6,5) S-CNTs. After the addition of DBU, bare CNTs crashed out of the solution, likely due to the polymer removal. This aggregate was centrifuged and washed with toluene and chloroform to remove any adsorbed polymer residues. The UV-vis spectrum from the washing solution showed a clear peak from the pyrene/PS groups in the 200-350 nm region, and the residues showed only a peak from the CNTs.

Figure 8:
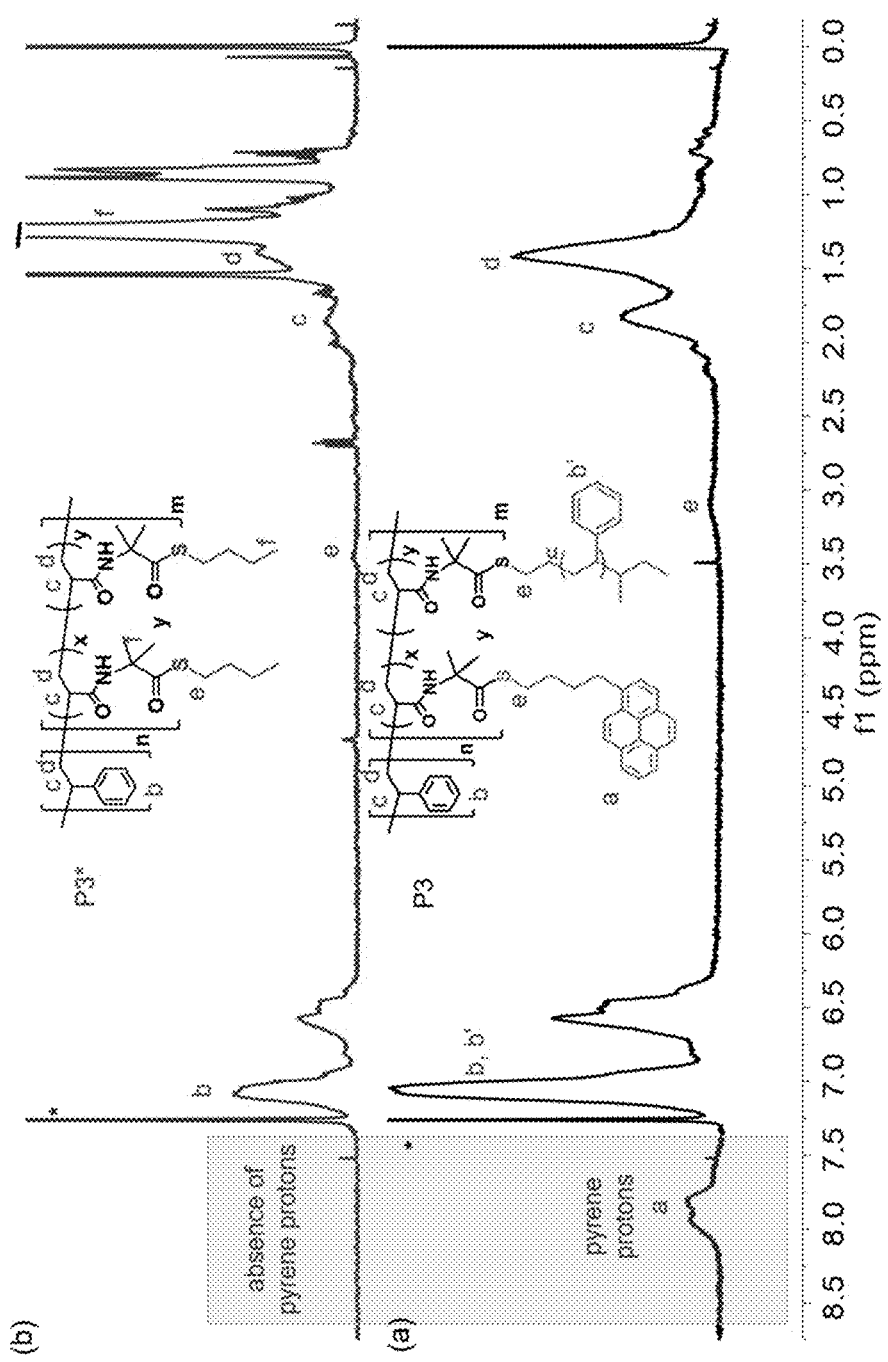
FIG. 8 shows $^1$H Nuclear Magnetic Resonance (NMR) spectra of P3 (bottom panel) and post wash solution of extracted P3 from CoMoCAT@P3 in (*) CDCl$_3$ after thiol exchange reaction (top panel), (highlighted the peaks of pyrene aromatic protons from 7.54-8.35 ppm).

The chemical identity of the exchanged polymer was confirmed by $^1$H NMR. The starting P3 (FIG. 8, bottom panel) polymer shows a broad peak from 7.54 to 8.35 ppm, 7.20-6.30 and 0.50-2.35 ppm corresponding to protons form pendant pyrene units, PS chains and the aliphatic protons respectively. The $^1$H NMR spectrum of the post wash solution from CNT @P3 after the exchange reaction shows complete removal of the peaks arising from pyrene (7.54 to 8.35 ppm) (FIG. 8, top panel), confirming quantitative replacement of the pyrene butyl thioester and polystyrene side chains with n-butane thiol. This quantitative exchange is due to a shift in the equilibrium of the reaction due to excess butane thiol, as well the low solubility of the resulting product, namely pyrene thiol in toluene, both of which drive the reaction forward.

Materials and Methods

All solvents and reagents were purchased from Sigma-Aldrich or other commercial sources and used without further purification unless otherwise noted. Styrene was stirred over calcium hydride, distilled under high vacuum and stored at 0° C. 2-vinyl-4,4-dimethylazlactone (VDMA) was synthesized according to the procedure described in Polym. Chem., 2011, 2, 2878-2887 and distilled under vacuum at 35° C. in the presence of 2,6-di-t-butyl-4-methylphenol (50 mg) and stored under argon at 0° C. 2,2'-Azobis (2-methylpropionitrile) (AIBN, 98% purity) was recrystallized from acetone and dried under vacuum prior to use. S-1-Dodecyl-S'-(α,α'-dimethyl-α"-acetic acid)trithiocarbonate, compounds 2-5, 4-pyren-1-yl-butyl-1-amine and 4-pyren-1-yl-butyl-1-thiol was synthesized according to the procedure described in *ACS Nano*, 2008, 2 (1), pp 77-84 and stored at 0° C.

Characterization $^1$H NMR and $^{13}$C NMR spectra were recorded using a Bruker AVANCE-400 spectrometer in CDCl$_3$ with trimethylsilane (0.1 vol %) as an internal standard. Gel-permeation chromatography (GPC) was performed with a Viscotek 2210 system equipped with three Waters columns (HR 4, HR 4E, HR 3) and a 1 mL/min flow rate of THF as eluent at 30° C. UV-vis measurements were performed using a Shimadzu PC-2401 spectrophotometer and home-built setup, in which an input monochromator was used to produce a beam of a wavelength (10 nm resolution) and was used to scan over the range of 300-1500 nm.

Synthesis

Synthesis of 4-pyren-1-yl-butyl methanesulfonate (2)

A solution of 4-pyren-1-yl-butanol (1, 0.76 g, 2.77 mmol) in dichloromethane (DCM, 15 mL) was prepared under the protection of dry argon. The N, N-diisopropyl ethylamine (DIPEA, 0.72 g, 5.54 mmol) was added to the solution at room temperature with stir. This mixture was then cooled to −5° C. by ice-salt bath. From an adding funnel, the diluted methanesulfonyl chloride (0.48 g, 4.16 mmol) solution in DCM (5 mL) was added slowly, and the reaction was stirred at −5° C. for 3 hours. Ice water (50 mL) was used to quench the reaction. The mixture was extracted by DCM (50 mL) three times. The organic layers were combined, dried by anhydrous magnesium sulfate and concentrated by rotary evaporator. The crude product as a pale-yellow oil was purified by column chromatography (hexane/ethyl acetate, 1:1) to yield a white solid (2, 0.93 g, 96%) as a pure product. $^1$H-NMR (500 MHz, CDCl$_3$, TMS) δ (ppm): 1.87 (m, 2H), 1.94 (m, 2H), 2.90 (s, 3H), 3.34 (t, 2H), 4.21 (t, 2H), 7.80 (d, 1H), 7.97 (m, 1H), 8.00 (s, 2H), 8.07 (s, 1H), 8.09 (d, 1H), 8.14 (m, 2H), 8.20 (d, 1H). $^{13}$C-NMR (126 MHz, CDCl$_3$, TMS) δ (ppm): 135.70, 131.36, 130.81, 129.92, 128.55, 127.44, 127.38, 127.19, 126.71, 125.85, 125.05, 124.95, 124.93, 124.78, 124.76, 123.10, 69.76, 37.27, 32.70, 28.97, 27.46.

Synthesis of thioacetic acid S-(4-pyren-1-yl-butyl) ester (3)

The purified 4-pyren-1-yl-butyl methanesulfonate (2, 1.36 g, 3.86 mmol) and potassium thioacetate (1.10 g, 9.65 mmol) were mixed in DMF (20 mL) under ambient condition. The solution was stirred at 30° C. for 4 h before working up with water (50 mL) and diethyl ether (50 mL). The water phase was extracted by diethyl ether (50 mL) two more times. The organic layers were combined, dried by anhydrous magnesium sulfate and concentrated by rotary evaporator. Crude produce as a yellow oil was purified by column chromatography (hexane/ethyl acetate, 6:1). The yellow solid collected can be recrystallized in diethyl ether to yield a white solid (3, 0.87 g, 94%) as a pure product. $^1$H-NMR (500 MHz, CDCl$_3$, TMS) δ (ppm): 1.76 (m, 2H); 1.94 (m, 2H); 2.32 (s, 3H); 2.95 (t, 2H), 3.36 (t, 2H), 7.85 (d, 1H), 7.99 (m, 1H), 8.03 (m, 2H), 8.10 (s, 1H), 8.12 (s, 1H), 8.17 (m, 2H), 8.26 (d, 1H). $^{13}$C-NMR (126 MHz, CDCl$_3$, TMS) δ (ppm): 195.95, 136.35, 131.42, 130.89, 129.84, 128.58, 127.50, 127.26, 127.24, 126.61, 125.80, 125.08, 125.02, 124.87, 124.80, 124.70, 123.32, 33.02, 30.87, 30.66, 29.60, 28.96.

Synthesis of 4-pyren-1-yl-butyl-1-thiol (Py-SH)

Thioacetic acid S-(4-Pyren-1-yl-butyl) ester (3, 0.87 mg, 2.59 mmol) was dissolved in 1,4-dioxane (40 mL) and bubbled with nitrogen for 30 minutes before adding degassed potassium hydroxide (1.45 g, 25.9 mmol) solution in water (5 mL). The mixture was heated at 100° C. and stirred for 4 hours. The cooled reaction mixture was diluted with deionized water (3×50 mL) and extracted with chloroform. The organic phases were combined, dried over anhydrous magnesium sulfate and evaporated by rotary evaporation. Crude yellow solid was purified by column chromatography using hexane and chloroform mixture (6:1 to 2:1 in gradient). The solid collected can be recrystallized in diethyl ether to yield light yellow crystals (Py-SH, 0.73 g, 96%) as a pure product. The thiol was kept in ambient environment for 4 weeks without detectable formation of disulfide. $^1$H-NMR (500 MHz, CDCl$_3$, TMS) δ (ppm): 1.33 (t, 1H) 1.77 (m, 2H); 1.94 (m, 2H); 2.58 (q, 2H), 3.33 (t, 2H), 7.84 (d, 1H), 7.97 (m, 1H), 8.01 (d, 2H), 8.08 (d, 1H), 8.10 (d, 1H), 8.15 (m, 2H), 8.24 (d, 1H). $^{13}$C-NMR (126 MHz, CDCl$_3$, TMS) δ (ppm): 136.39, 131.40, 130.86, 129.81, 128.56, 127.47, 127.24, 127.19, 126.59, 125.79, 125.06, 124.99, 124.86, 124.77, 124.68, 123.28, 33.96, 32.96, 30.46, 24.53. MS (C$_{20}$H$_{18}$S) m/z: [M]$^+$. calculated: 290.11, found: 290.1124.

Synthesis of 4-pyren-1-yl-butanamide (5)

A suspension of 1-Pyrenebutyric acid (1 g, 3.47 mmol) in chloroform (20 mL) and DMF (0.1 mL) was pre-cooled in an ice bath. Oxalyl chloride (0.5 g, 3.94 mmol) was diluted in chloroform (5 mL) first and then added slowly into the suspension. The reaction was done within 30 minutes, indicated by a dark purple solution. This solution was bubbled by dry ammonia gas for 30 minutes at 0° C. then 2 hours at room temperature with vigorous stirring. Dry ammonia gas was generated by adding concentrated aqueous ammonia onto sodium hydroxide. The reaction mixture was washed by 10% NaOH aqueous solution first, then by water (50 mL) three times, dried by anhydrous sodium sulfate, and concentrated by rotary evaporator. The crude product 4-pyren-1-yl-butanamide (5, 0.94 g, 93%) was obtained as a light brown solid (5, 0.94 g, 93%) and used without further purification.

Synthesis of 4-pyren-1-yl-butyl-1-amine (Py-NH$_2$)

4-pyren-1-yl-butanamide (5, 0.94 g, 3.27 mmol) was dissolved in anhydrous THF (50 mL) under nitrogen atmosphere. Lithium aluminum hydride (LiAlH$_4$, 0.38 g, 10 mmol) was added portion wise to the stirred solution at room temperature under nitrogen atmosphere. A cloudy mixture was observed which was stirred for 3 h at room temperature and then quenched by deionized water (1 mL). NaOH aqueous solution (2 mL, 10%) was added, and then water (5 mL), to precipitate a white solid in a brown solution. The precipitate was filtered and washed by water to yielding a white solid (Py-NH$_2$, 0.7 g, 78%) as a pure product. $^1$H-NMR (400 MHz, CDCl$_3$, TMS) δ (ppm): 1.62 (m, 2H); 1.88 (m, 2H); 2.75 (t, 2H), 3.36 (t, 2H), 7.86 (d, 1H), 7.98 (m, 1H), 8.01 (d, 2H), 8.10 (dl, 1H), 8.10 (d, 2H), 8.14 (d, 2H), 8.16 (dd, 2H), 8.27 (d, 1H).

Synthesis of poly(2-vinyl-4,4-dimethylazlactone) (PVDMA)

2-vinyl-4,4-dimethylazlactone (7.5 g, 0.054 mol), S-1-Dodecyl-S'-(α,α'-dimethyl-α"-acetic acid)trithiocarbonate (0.122 g, 3.37×10$^{-4}$ mol), AIBN (9.0 mg), were added to an oven dried 25 mL Schlenk tube. To this mixture anhydrous toluene (8 mL) was added, and the solution was degassed via three freeze-pump-thaw cycles. The solution was placed in a 60° C. oil bath and stirred for 4 h at the same temperature. After 4 h of reaction the reaction mixture was precipitated in hexanes and the precipitates were collected, re-dissolved in THF, and re-precipitated in hexanes. $^1$H NMR (400 MHz, CDCl$_3$, TMS) δ (ppm): 2.80-2.57 (broad singlet, backbone C—H), 2.16-1.57 (m, backbone C—H2), 1.37 (s, Azlactone C—H3).

Synthesis of Polystyrene Macroinitiator (PSMI)

Freshly purified styrene (10 mL, 0.096 mol) and S-1-Dodecyl-S'-(α,α'-dimethyl-α"-acetic acid)trithiocarbonate (0.157 mg, 4.32×10$^{-4}$ mol) and were added to an oven dried 100 mL Schlenk tube and degassed via three freeze-pump-thaw cycles. The solution was placed in an oil bath preheated to 120° C. and stirred at the same temperature for 13 h. The resulting polymer was precipitated in cold methanol, and the precipitate was collected. The polymer was redissolved in THF, and precipitated in cold methanol. This process was repeated twice and, the solid was dried under high vacuum and stored at 0° C. $^1$H NMR (400 MHz, CDCl$_3$, TMS) δ (ppm): 7.25-6.30 (m, aromatic C—H), 2.20-1.26 (m, backbone C—H2).

General Synthesis of Poly(Styrene-Block-Vinyldimethylazlactone) (PS-b-PVDMA)

Poly styrene macroinitiator (PSMI) (1.0159 g, 5×10$^{-5}$ mol), 2-vinyl-4,4-dimethylazlactone (1.5 mL, 0.01 mol) and AIBN (1.4 mg), were added to an oven dried 25 mL Schlenk tube. To this, anhydrous toluene (8 mL) was added under nitrogen atmosphere, and the reaction mixture was degassed via three freeze-pump-thaw cycles. The Schlenk tube was placed in an oil bath preheated at 60° C., and the reaction was stirred at the same temperature for 4 h. The reaction mixture was precipitated in hexanes and collected, redissolved in THF, re-precipitated in hexanes, and the solid was dried under high vacuum and stored at 0° C. $^1$H NMR spectra confirms the formation of polystyrene macro initiator and chain extension with VDMA to form PS-b-PVDMA. $^1$H NMR (400 MHz, CDCl$_3$, TMS) δ (ppm): 7.22-6.30 (m, styrene aromatic C—H), 2.81-2.57 (bs, azlactone C—H), 2.20-1.54 (m, backbone C—H2), 1.36 (bs, azlactone C—H3).

Nucleophilic Ring Opening of Azlactone by 1-Pyrene Butane Thiol

PS-b-PVDMA (1 mmol), and Py-SH (20, 45 and 75 mmol for the synthesis of P1(A), P1(B) and P1(D) respectively) was taken in an oven-dried, 25 mL Schlenk tube. To this mixture 2 mL of anhydrous THF was added under an inert atmosphere, and the mixture was degassed via three freeze-pump-thaw cycles to remove any dissolved oxygen. To this deoxygenated reaction mixture, excess of 1,8-Diazabicyclo [5.4.0]undec-7-ene (DBU) was added immediately and the mixture was stirred at room temperature for 2 h. After 2 h solvent was removed from the reaction mixture, the residual solid was dissolved with a small amount of dichloromethane (3 mL) and precipitated in hexanes (8 mL). The resultant white solid was re-dissolved in dichloromethane (2 mL) and re-precipitated into hexanes, and the final polymer was dried under vacuum and stored at 0° C. $^1$H NMR: (400 MHz, CDCl$_3$, TMS) δ (ppm): 8.25-7.34 (Pyrene aromatic C—H), 7.23-6.23 (m, styrene aromatic C—H), 3.37-0.88 (backbone C—H2).

Nucleophilic Ring Opening of Azlactone by 1-Pyrene Butyl Amine

PVDMA (1 mmol) was dissolved in 1.5 mL of anhydrous THF in a 6-mL glass vial. To this solution, 1-pyrene butyl amine (40 mmol) was added. The vial was sealed with a Teflon cap and placed in a 50° C. oil bath overnight. The solution was concentrated using a rotary evaporator and precipitated into ~8 mL of hexanes. The resulting white powder was re-dissolved in ~0.5 mL DCM and re-precipitated once more in hexanes, and the solid was dried under high vacuum and stored at 0° C. $^1$H NMR: (400 MHz, CDCl$_3$, TMS) δ (ppm): 1.62-3.45 (aliphatic backbone protons); 6.35-7.25 (styrene aromatic protons); 7.45-8.25 (Pyrene aromatic protons).

Dispersion of CoMoCAT CNTs, Arc-D and HiPCo CNTs Using P1-P3

Small-diameter CoMoCAT CNTs (773735, Sigma-Aldrich) with a diameter of 0.7-0.9 nm were dispersed using P1, P2 and P3. Large-diameter, arc discharge CNT powder (750514, Sigma-Aldrich) or a HiPCO carbon nanotube powder (Raw, NanoIntegris R1-831) were dispersed using P3. A 1:10 weight ratio of 1 mg/ml of the powder and 10 mg/mL P1-P3 were dispersed in 10 ml of toluene using a horn tip sonicator (Thermo Fisher Scientific, Sonic Dismembrator 500) at 64 W power. The sonication time of the initial dispersion was 10 min. Following the initial dispersion, the CNT solution was centrifuged (Thermo Fisher Scientific, Sorvall WX, swing bucket rotor, TH-641) at 41 krpm for 10 min. to remove un-dispersed materials. The upper 90% of the supernatant was collected and, optionally, the toluene was distilled, rendering a gel-like P3-CNT mixture. The solution was then washed with toluene, chloroform and centrifuged to rinse off as much excess P3 as possible.

Polymer Exchange Reaction by Thiol-Thioester Exchange Reaction

To a stirred solution of P3 in 10 mL toluene was added 10-fold large excess of n-butane thiol at room temperature. To this reaction mixture excess of 1,8-Diazabicyclo[5.4.0] undec-7-ene (DBU) was added under inert atmosphere, and the solution was stirred at the same temperature for 20 min. After the 20 min of reaction, the solvent was reduced to half and the residual viscus solution was precipitated in methanol. Precipitates were collected and was redissolved in 5 mL of chloroform and re-precipitated in 20 mL of methanol. This resulted in a white solid, which was confirmed as the new exchanged polymer P3* and the supernatant as pyrene small molecules. The polymer exchange reaction was confirmed by the absence of pyrene peaks in the $^1$H NMR spectrum of P3* by comparing P3 before and after thiol-thioester ester exchange reaction.

Removal of P3 from S-CNT Surface in Solution

To a stirred solution of CNT@P3 in toluene was added 10-fold large excess of n-butane thiol at room temperature. To this reaction mixture excess of 1,8-Diazabicyclo[5.4.0] undec-7-ene (DBU) was added and the solution was stirred at the same temperature for 10 min. slowly after the addition of DBU precipitates were observed. The stirring was continued for 10 more min and the mixture was centrifuged. 70% of the supernatant was removed and the precipitates were washed with toluene and chloroform to rinse off the polymer P3*as much as possible. The polymer removal was monitored by UV-visible absorption spectroscopy. The absence of absorption peaks of pyrene at ~300 and 320 nm confirmed the complete removal of the polymer.

Removal of P3 from S-CNT Surface in Thin Film

CNT @P3 was spin coated on a hexamethyldisilzane (HMDS) treated Si substrate and the excess polymer was removed by rinsing with hot toluene. After rinsing the substrate, it was immersed in a flask containing 20 mL of toluene and a large excess of n-butane thiol (2 mL). To this solution excess of 1,8-Diazabicyclo[5.4.0]undec-7-ene (DBU) was added and the solution was stirred at a temperature of 50° C. for 2 h and the Si substrate was washed with hot toluene, THF and acetone to remove the exchanged polymer (P3*) and other byproducts. Polymer removal was confirmed by X-ray Photoelectron Spectroscopy (XPS) and AFM images taken before and after polymer removal from CNT @P3.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A block copolymer comprising:
    a first polymer block; and
    a second polymer block, the second polymer block comprising a polymer backbone chain and pendant polycyclic aromatic hydrocarbon groups, wherein the pendant polycyclic aromatic hydrocarbon groups are covalently linked to the polymer backbone chain by molecular linkers that comprise a thioester bond and further wherein the polycyclic aromatic hydrogen groups comprise multiple $C_6$ rings.

2. The block copolymer of claim 1, wherein the polycyclic aromatic hydrocarbon groups are pyrene groups.

3. The block copolymer of claim 2, wherein the second polymer block further comprises pendant molecular chains covalently linked to the polymer backbone chain.

4. The block copolymer of claim 3, wherein the first polymer block is a polystyrene block.

5. The block copolymer of claim 4, wherein the molecular chains comprise polystyrene chains.

6. A block copolymer comprising:
    a first polymer block; and
    a second polymer block, the second polymer block comprising a polymer backbone chain and pendant polycyclic aromatic hydrocarbon groups, wherein the pendant polycyclic aromatic hydrocarbon groups are covalently linked to the polymer backbone chain by molecular linkers that comprise a thioester bond, and further wherein the second polymer block further comprises pendant molecular chains covalently linked to the polymer backbone chain.

7. The block copolymer of claim 6, wherein the molecular chains are linked to the polymer backbone chain via a thioester bond.

8. The block copolymer of claim 6, wherein the molecular chains comprise polystyrene chains.

9. The block copolymer of claim 6, wherein the molecular chains comprise polyalkyl chains comprising at least six carbon atoms.

10. A block copolymer, comprising:
    a polystyrene block; and
    a second polymer block, the second polymer block comprising a polymer backbone chain and pendant polycyclic aromatic hydrocarbon groups, wherein the pendant polycyclic aromatic hydrocarbon groups are covalently linked to the polymer backbone chain by molecular linkers that comprise a thioester bond.

11. The block copolymer of claim 6, wherein the first polymer block is a polystyrene block.

12. Polymer-coated carbon nanotubes comprising:
carbon nanotubes; and
a block copolymer coating the carbon nanotubes, the block copolymer comprising:
a first polymer block; and
a second polymer block, the second polymer block comprising a polymer backbone chain and pendant polycyclic aromatic hydrocarbon groups, wherein the pendant polycyclic aromatic hydrocarbon groups are covalently linked to the polymer backbone chain by molecular linkers that comprise a thioester bond.

13. The polymer-coated carbon-nanotubes of claim 12, wherein the polycyclic aromatic hydrocarbon groups are pyrene groups.

14. The polymer-coated carbon-nanotubes of claim 13, wherein the second polymer block further comprises pendant molecular chains covalently linked to the polymer backbone chain.

15. The polymer-coated carbon-nanotubes of claim 14, wherein the first polymer block is a polystyrene block.

16. The polymer-coated carbon-nanotubes of claim 15, wherein the molecular chains comprise polystyrene chains.

17. The polymer-coated carbon-nanotubes of claim 12, wherein the second polymer block further comprises pendant polystyrene chains covalently linked to the polymer backbone chain.

18. The polymer-coated carbon nanotubes of claim 17, wherein the polystyrene chains are linked to the polymer backbone chain via a thioester bond.

19. The polymer-coated carbon nanotubes of claim 12, wherein the first polymer block is a polystyrene block.

20. The polymer-coated carbon nanotubes of claim 12, wherein the carbon nanotubes are single-walled carbon nanotubes.

21. A method of forming a carbon nanotube film, the method comprising:
forming a film of polymer-coated carbon nanotubes on a substrate, the polymer-coated carbon nanotubes comprising:
carbon nanotubes; and
a block copolymer coating the carbon nanotubes, the block copolymer comprising:
a first polymer block; and
a second polymer block, the second polymer block comprising a polymer backbone chain and pendant polycyclic aromatic hydrocarbon groups, wherein the pendant polycyclic aromatic hydrocarbon groups are covalently linked to the polymer backbone chain by molecular linkers that comprise a thioester bond;
exchanging the pendant polycyclic aromatic hydrocarbon groups with thiol molecules that do not bond to the carbon nanotubes, whereby the polymer coating is released from the carbon nanotubes; and
removing the polymer coating from the carbon nanotubes.

22. The method of claim 21, wherein the polycyclic aromatic hydrocarbon groups are pyrene groups.

23. The method of claim 22, wherein the second polymer block further comprises pendant molecular chains covalently linked to the polymer backbone chain.

24. The method of claim 23, wherein the first polymer block is a polystyrene block.

25. The method of claim 24, wherein the molecular chains comprise polystyrene chains.

26. The method of claim 21, wherein the second polymer block further comprises pendant polystyrene chains covalently linked to the polymer backbone chain.

27. The method of claim 26, wherein the first polymer block is a polystyrene block.

28. The method of claim 21, wherein the carbon nanotubes are single-walled carbon nanotubes.

* * * * *